Feb. 4, 1936.  B. S. KELLY  2,029,571

TURPENTINE GUM CUP COVER

Filed April 29, 1935

Inventor

*B. S. Kelly,*

By *Clarence A. O'Brien*

Attorney

UNITED STATES PATENT OFFICE 2,029,571

TURPENTINE GUM CUP COVER

Bryant S. Kelly, Lumber City, Ga.

Application April 29, 1935, Serial No. 18,936

3 Claims. (Cl. 47—11)

My invention relates generally to means used in the extraction of gums from trees, and particularly to a turpentine gum cup for attachment to a turpentine gum tree, and an important object of the invention is to provide a cover for a cup of this class which has a novel arrangement which prevents the falling of dirt, trash, straw, and the like into the cup while the cup is on the tree, thereby insuring clean clear gum.

Another important object of my invention is to provide means of the character indicated above which eliminates the necessity for the chipper to carry a paddle to protect the cup while chipping the face of the tree.

Another important object of my invention is to provide means of the character indicated above which prevents or reduces the evaporation of the gum while the same is standing in the cup, which eliminates the collection of water in the gum in the cup, and which prevents the gum from being washed out of the cup and wasted onto the ground.

It is also an important object of my invention to provide a device having the advantages indicated above and other advantages, which can be produced at a sufficiently low cost to be practical, and which is very easily installed and maintained.

Other objects and advantages of my invention will be apparent from a reading of the following description in connection with the drawing, wherein for purposes of illustration I have shown a preferred embodiment of my invention.

In the drawing:—

Figure 1:
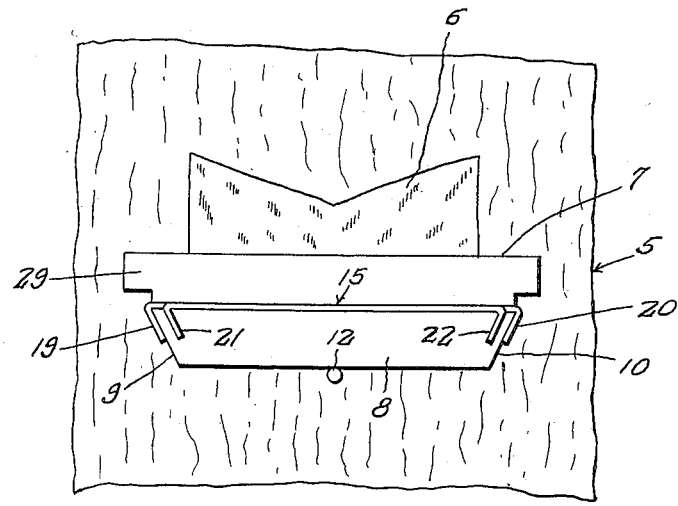
Figure 1 is an elevational view of a portion of a turpentine gum tree showing the cup and the present invention mounted thereon.

Referring in detail to the drawing, the numeral 5 refers generally to the turpentine gum tree or the like having the face thereof chipped as indicated at 6 to permit the gum to exude into the cup which is generally designated 7.

The cup comprises the pan 8 having the slanting sides 9 and 10 and the open top, and the pan is supported in position under the cut 6 in the face of the tree by a nail 11 centrally located thereunder and with the head 12 engaging the outer end of the pan.

Figures 2, 3:
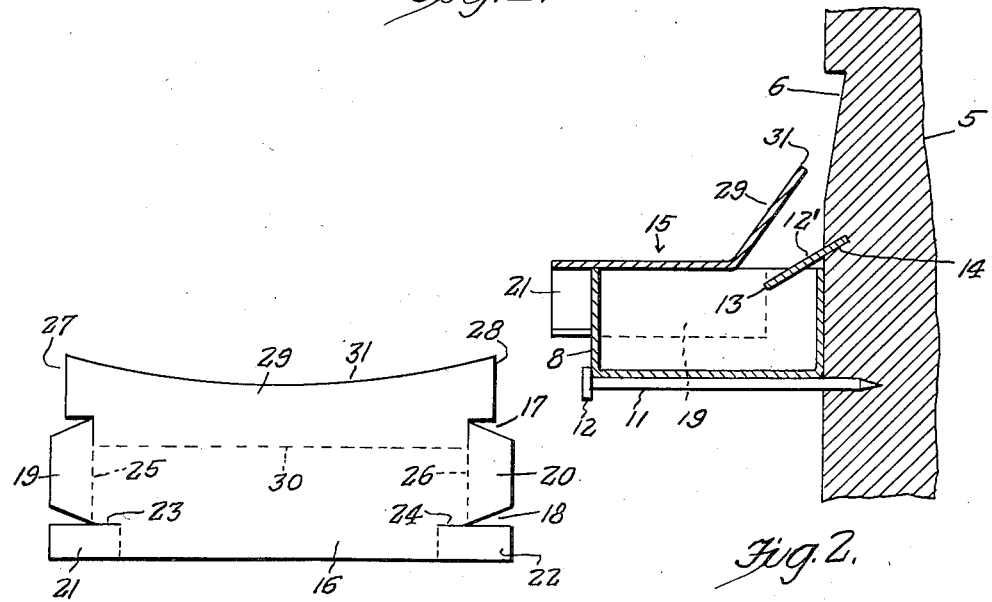
Figure 2 is a transverse vertical sectional view taken approximately centrally through Figure 1.
Figure 3 is a plan view of the cover of the cup before the various tabs thereon have been bent down.

The apron 12' is disposed at a suitable angle over the inner end wall of the pan and the lower edge of the apron indicated by the numeral 13 is disposed well into the pan as shown in Figure 2, the upper edge of the apron being engaged in a slot in the face of the tree as indicated by the numeral 14, whereby the apron is supported independently of the tray and cover.

The cover for the tray which is generally designated 15 is formed of the blank shown in Figure 3. At each end of the plate 16 from which the cover is formed are made triangular cuts 17 and 18, respectively, which define the guide tabs 19 and 20, respectively, and the stop tabs 21 and 22, respectively, the tabs 21 and 22 being further defined by cuts 23 and 24, these cuts being made to a depth which brings the inner ends of the tabs inwardly of the lines 25, 26 on which the tabs 19 and 20 are to be bent. The cuts 17 also define the extensions 27 and 28 of the shield portion 29 which is to be bent upwardly on the longitudinal upper line 30. The shield 29 has its longitudinal edge 31 curved to conform to the general contour of the tree so as to closely approach the side of the tree. The positioning of this upper edge of the shield in the cut 6 in the side of the tree is shown in Figure 2, wherein it appears that by reason of this arrangement the shield is in a position which is very close to the side of the tree, so that objects falling from above are prevented from falling between the shield and the tree and into the pan 8.

The tabs 19 and 20 are bent downwardly at an acute angle to slide on the sides 9 and 10 of the pan 8 as indicated in Figure 1, so that the cover cannot be taken off or placed on except by sliding the same toward and away from the front of the pan.

The tabs 21 and 22 are bent downwardly at an angle approximating the angle of the tabs 19 and 20 on their inwardly located bending lines shown in Figure 3, so that the tabs 21 and 22 act as stops when they engage the front wall of the pan to prevent the cover from being pushed too far on the pan and also to act as a means for indicating to the operator when he has sufficiently and properly positioned the cover 15.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A gum cup of the character described comprising a pan for mounting on a tree below a cut thereon, a cover slidably mounted on said pan and having a shield closely approaching said cut and overlying the inward part of the pan and protecting the entrance of the gum from the cut into the pan.

2. A cup of the character described comprising a pan, a cover slidable thereon and having at its inward end an upwardly angulated shield overlying the pan and closely approaching the inward end of the pan, said cover including stops on the front end thereof engageable with the front part of the pan for limiting the movement of the cover on the pan toward the said inner end thereof and for indicating the proper positioning of the cover on the pan.

3. A gum cup of the character described comprising a pan for mounting on a tree below a cut thereon, a cover slidably mounted on said pan and having a shield closely approaching said cut and overlying the inward part of the pan and protecting the entrance of the gum from the cut into the pan, said cover including depending guide tabs slidably engageable with the opposite sides of the pan.

BRYANT S. KELLY.